(12) United States Patent
Deleris et al.

(10) Patent No.: US 8,537,035 B2
(45) Date of Patent: Sep. 17, 2013

(54) AIRCRAFT CONTROL CABIN WITH AVIONICS DISPLAY DEVICE

(75) Inventors: Yannick Deleris, Grenade (FR); Gregory Detouillon, Toulouse (FR); Vincent Lautridou, Colomiers (FR)

(73) Assignee: Airbus Operations S.A.S., Toulouse (FR)

( * ) Notice: Subject to any disclaimer, the term of this patent is extended or adjusted under 35 U.S.C. 154(b) by 272 days.

(21) Appl. No.: 13/000,685

(22) PCT Filed: Jun. 23, 2009

(86) PCT No.: PCT/FR2009/000756
§ 371 (c)(1),
(2), (4) Date: Dec. 22, 2010

(87) PCT Pub. No.: WO2010/004114
PCT Pub. Date: Jan. 14, 2010

(65) Prior Publication Data
US 2011/0102198 A1 May 5, 2011

(30) Foreign Application Priority Data
Jun. 26, 2008 (FR) ..................................... 08 54287

(51) Int. Cl.
*G01C 23/00* (2006.01)
(52) U.S. Cl.
USPC ........... 340/971; 340/461; 340/945; 340/973; 340/974; 701/14
(58) Field of Classification Search
None
See application file for complete search history.

(56) References Cited

U.S. PATENT DOCUMENTS

| 4,529,150 | A | 7/1985 | Owen et al. |
| 6,236,913 | B1 | 5/2001 | Bomans et al. |
| 2003/0211448 | A1* | 11/2003 | Quimper et al. .............. 434/219 |

(Continued)

FOREIGN PATENT DOCUMENTS

| EP | 0 098 090 | 1/1984 |
| FR | 2 663 605 | 12/1991 |

(Continued)

OTHER PUBLICATIONS

International Search Report issued Jan. 14, 2010 in PCT/FR09/00756 filed Jun. 23, 2009.

(Continued)

*Primary Examiner* — Tai T Nguyen
*Assistant Examiner* — Ojiako Nwugo
(74) *Attorney, Agent, or Firm* — Oblon, Spivak, McClelland, Maier & Neustadt, L.L.P.

(57) ABSTRACT

This aircraft control cabin comprises an avionics display device with multiple fixed screens (10a-10d) and at least one screen (15, 16) as an accessory, designed to be a replacement screen or extra screen for the avionics display system. The screen (15, 16) is a touch screen housed in a retractable tablet which slides underneath an instrument panel in the control cabin, the touch screen (15, 16) being designed to occupy a stowed position underneath the instrument panel, a first position of use in the retractable tablet in which the touch screen (15, 16) acts as a means of interaction for controlling various items in the control cabin and a second position of use in which the touch screen (15, 16) is put in a position in which it replaces or supplements a screen (10a-10d) belonging to the avionics display system. Use in an aircraft.

7 Claims, 3 Drawing Sheets

(56) References Cited

U.S. PATENT DOCUMENTS

| | | | |
|---|---|---|---|
| 2006/0218244 A1* | 9/2006 | Rasmussen et al. | 709/218 |
| 2006/0286944 A1* | 12/2006 | Songwe, Jr. | 455/99 |
| 2007/0019297 A1* | 1/2007 | Stewart et al. | 359/630 |
| 2008/0215192 A1* | 9/2008 | Hardman et al. | 701/3 |
| 2009/0128307 A1* | 5/2009 | Hentsch et al. | 340/425.5 |
| 2010/0001132 A1 | 1/2010 | Detouillon et al. | |

FOREIGN PATENT DOCUMENTS

| | | | |
|---|---|---|---|
| FR | 2 748 145 | | 10/1997 |
| FR | 2 873 989 | A1 | 2/2006 |
| FR | 2 892 092 | A1 | 4/2007 |
| FR | 2 900 634 | A1 | 11/2007 |
| FR | 2 907 758 | A1 | 5/2008 |

OTHER PUBLICATIONS

French Preliminary Search Report issued Jan. 22, 2009, in French Patent Application No. 0854287 with English translation of category of cited documents.

* cited by examiner

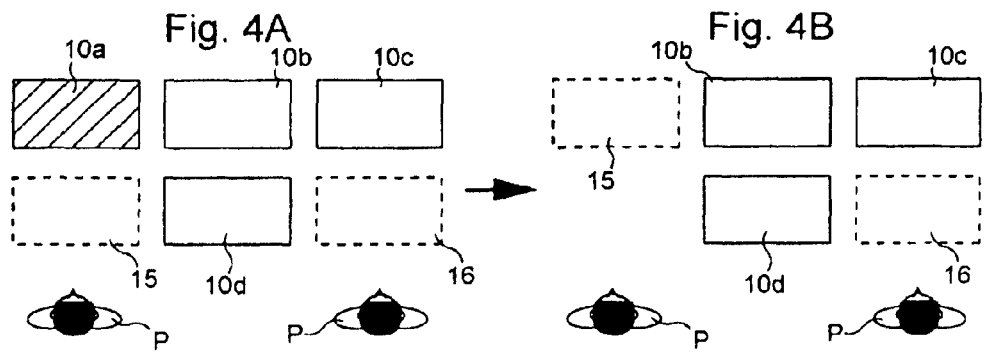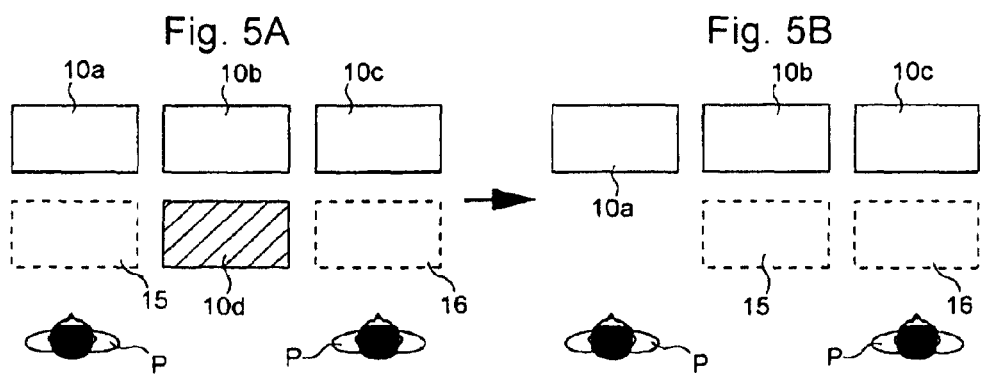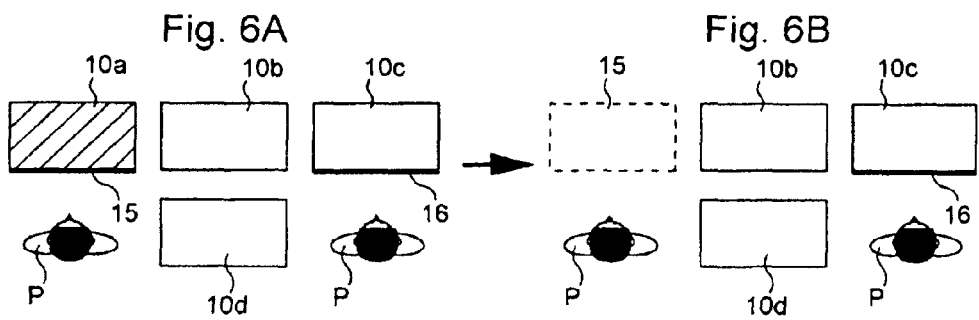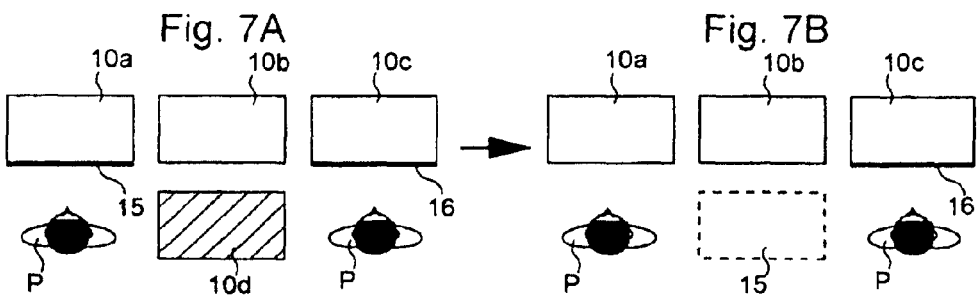

AIRCRAFT CONTROL CABIN WITH AVIONICS DISPLAY DEVICE

This invention relates to an aircraft cockpit comprising an avionic display device.

In general, this invention finds its application in the field of cockpits of an aircraft, also commonly called cockpits, and relates more particularly to means for display of information items for the crew.

In modern aircraft cockpits, the display of information items is accomplished by means of an avionic display system comprising a series of fixed screens connected to a set of computers capable of generating, from different sensors of the airplane, information items that can be presented in synthetic form that can be interpreted by the pilots.

This fixed display system in a cockpit thus offers a constant display surface, sized to take into account all situations and needs in terms of display, in this way making it possible to display all the information items necessary to the pilots.

This sizing of the screens has the result that, even if in certain particularly busy phases, all the screens of the fixed display system are essential to the proper conduct of operations, for most of the use time of the aircraft the display surface offered to the pilots is oversized in relation to needs.

This oversizing moreover results in multiplying the available sources of information items and thus dividing the attention of the pilots.

In fact, the more sources of information items there are in the cockpit, the more complex the visual circuit which the pilot must follow in order to take all the available information items into account. Moreover, the cognitive effort necessary for sorting out and seeking out information items is very considerable when a large number of screens is available to the pilot.

Furthermore, in case of loss of a screen of the display system, the essential information items then are reconfigured on another screen of the display system, making it necessary for the pilot to change the visual path in order to access these information items.

Since the relative position of the information items thus is changed in the cockpit, access to the displayed information items then is disturbed for the pilots.

In the document FR 2 663 605 there is known an aircraft cockpit in which an additional screen is provided, complementary to the fixed screens of the cockpit, for displaying further information items.

Such an additional screen, however, has only a very isolated and limited use in the cockpit.

This invention has as a purpose to offer a display device allowing better ergonomics and functionality of the display system of a cockpit.

In this respect, this invention relates to an aircraft cockpit comprising an avionic display device with several fixed screens and at least one screen as an ancillary, adapted for constituting a replacement or complementary screen for the avionic display system.

According to the invention, the screen is a touch screen accommodated in a retractable shelf installed sliding underneath an instrument panel of the cockpit, the touch screen being adapted to occupy a storage position underneath the instrument panel, a first use position in the retractable shelf in which the touch screen constitutes an interactive means for controlling different components of the cockpit and a second use position in which the touch screen is disposed in a position of replacement or complement for a screen of the avionic display system.

This display device thus makes it possible to size the fixed display system with correct proportions, allowing display of the data necessary for conduct of operations in most cases.

In case of failure of a screen, or at the time of an isolated need for display of additional information items, the display device comes to supplement or replace a screen of the display system.

In this way, in case of loss of a fixed screen, the essential information items that were available on this fixed screen may be reconfigured on the display device.

The storage position moreover makes it possible to remove from the pilot's field of vision the screens not essential to the proper development of the operation in progress.

In this way, the pilot's visual circuit is streamlined, his being able to concentrate on the main information items displayed on the fixed display system.

Furthermore, when the touch screen is not being used as a display screen, it constitutes an interactive means for controlling components of the cockpit.

As a result of the position of this touch screen in a retractable shelf, underneath an instrument panel, its use as an interactive means is facilitated for the pilot seated in front of the instrument panel.

In practice, the touch screen is adapted for being positioned in the cockpit superposed on at least one fixed screen in the second use position.

In this way, the touch screen replaces the faulty screen not only functionally but also physically, the visual path of the pilot for accessing the displayed information thus being unchanged or hardly changed in case of failure of a screen.

According to an advantageous characteristic of the invention, the touch screen is adapted for being positioned in the cockpit in a position adjacent to at least one fixed screen, the touch screen being configured for displaying specific functions complementary to functions displayed on the said fixed screen.

In this way the display device makes it possible to increase the display surface presented to the pilot in certain particularly complex operational phases.

In practice, the touch screen constitutes, in the first use position, an interactive means for navigating in the fixed screens by means of control by a cursor.

Finally, this invention relates to an aircraft comprising a cockpit according to the invention.

Other features and advantages of the invention also will become apparent in the description below.

On the attached drawings, provided by way of non-limitative examples:

FIG. 1 schematically illustrates a cockpit according to an embodiment of the invention, display devices being in storage position;

FIGS. 4A, 4B, 5A, 5B, 6A, 6B, 7A, 7B are views similar to FIG. 1 illustrating different methods of use of the display device in case of failure of a fixed screen.

First of all, an aircraft cockpit according to an embodiment of the invention is going to be described with reference to FIG. 1.

Figure 1:
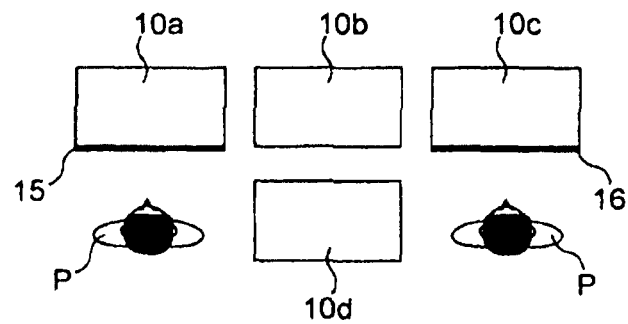

A cockpit allowing two pilots P to perform all the flight maneuver and control operations of an aircraft has been illustrated schematically on FIG. 1.

This cockpit comprises an avionic display device allowing the pilots to display very diverse information items on screens in order to fly the aircraft successfully.

In this embodiment, and in a manner in no way limitative, the avionic display device comprises several fixed screens, and here four fixed screens 10a, 10b, 10c, 10d.

These fixed screens 10a-10d are connected to computers or data-processing machines (not shown) making it possible to generate different information items, especially in cooperation with sensors of the aircraft.

In particular, the avionic display system may comprise at least one CDS (acronym in English for Control and Display System) screen, making it possible, in a specific embodiment, to display the electronic flight instruments.

It further comprises an EFB (acronym for the English term Electronic Flight Bag) screen, making it possible to interface a documentation and flight information computer system.

Of course, in another embodiment, the data of the electronic flight instruments and the flight information and documentation data may be displayed on the same screen.

This cockpit further comprises at least one screen as an ancillary to the display device.

This screen may be repositioned in the cockpit and thus may occupy numerous positions according to its use.

Figure 2:
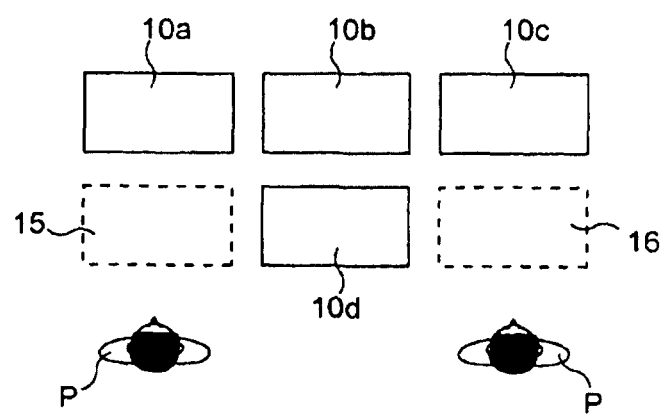
FIGS. 2 and 3 are views similar to FIG. 1 illustrating different use positions of the display devices according to an embodiment of the invention.
Figure 3:
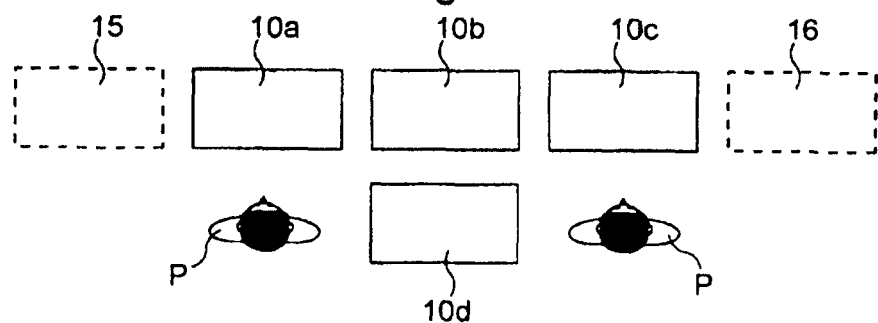

In this embodiment, as illustrated on FIG. 1, the cockpit comprises two screens 15, 16 illustrated in storage position on FIG. 1 and in use position on FIGS. 2 and 3.

In this embodiment, each screen 15, 16 is integrated into the cockpit and here is stored in a retractable shelf installed sliding underneath the instrument panel of the cockpit, above which fixed screens 10a-10d of the fixed display system are placed.

In this way, screens 15, 16 in storage position do not extend beyond the instrument panel and do not disturb the field of vision of the pilots.

By virtue of this retractable shelf, screens 15, 16 thus may be stored underneath an instrument panel, without interfering visually with fixed display screens 10a-10d of the display system of the cockpit.

In this way there are available two screens 15, 16 that may be stored at a distance from the fixed display system of the cockpit so as not to hamper or overload the field of vision of the pilots.

The installation of a screen in a retractable shelf underneath the instrument panel of the cockpit does not need to be explained in detail here and may be implemented by the individual skilled in the art by any appropriate mechanical means.

In the embodiment illustrated on FIGS. 1 to 3, screens 15, 16 are adapted, apart from their storage position, for occupying a first use position in which screen 15, 16 is positioned in the retractable shelf (FIG. 2) and a second use position in which screen 15, 16 is pulled out from the retractable shelf and is disposed in a position of replacement or complement for a fixed screen 10a-10d of the avionic display system.

Here, screens 15, 16 further comprise means for interaction with at least one control component of the cockpit.

In this way, screens 15, 16 may be used not only for display functions but also as interactive means for controlling various functions accessible to the pilots.

In particular, screens 15, 16 may be used as the principal means for interaction with the cockpit, thus making it possible to address different functions, and in particular to navigate in fixed display screens 10a-10d by means of control by a cursor and to interact with applications through the cursor.

These screens 15, 16 also may be used as backup instruments in case of loss of another interactive means.

In practice, screens 15, 16 here may consist of a touch screen.

Such a screen makes it possible to fulfill display functions and also at the same time to provide a virtual keyboard and a virtual keypad enabling the pilot to interact with the different components of the cockpit.

Such a screen 15, 16 thus may be accommodated in the place of a physical keyboard and a pointing device for interaction with fixed screens 10a-10d of the display system, usually placed in a shelf sliding underneath fixed screens 10a-10d in an aircraft cockpit.

In this way screen 15, 16 makes it possible to interact in place of these equipment items with fixed display screens 10a-10d of the display device of the aircraft.

As illustrated on FIG. 2, touch screen 15, 16 thus may be disposed between each pilot P and fixed screens 10a-10d of the display system of the aircraft in order to allow an easy control of navigation in the different formats or windows displayed by these fixed screens 10a-10d.

The touch screen preferably is a screen with feedback.

This type of technology may be based in known manner on a haptic technology, allowing a feedback and giving a feeling of sinking in upon noting a pressing on the screen by the pilot with a finger or with the aid of a stylet.

As illustrated on FIG. 3, screens 15, 16 also may be disposed outside the retractable shelf and near a fixed screen 10a-10d of the display system.

In the embodiment illustrated on FIG. 3, and in a manner in no way limitative, a first screen 15 is adapted for being fixed in the cockpit in a position adjacent to screen 10a of the fixed display system and a second screen 16 is adapted for being fixed in a position adjacent to screen 10c of the fixed display system.

These screens 15, 16 then are connected to the on-board computers and configured for displaying specific functions complementary to functions displayed on fixed screens 10a, 10c.

In this way, according to the needs of the pilots, additional information items may be displayed on screens other than those initially provided in the fixed display system of the cockpit.

This solution has the advantage of not oversizing the fixed display system in number of screens and of adapting this only in case of need, by adding one or more screens 15, 16 near fixed screens 10a-10d.

Furthermore, as clearly illustrated on the following Figures, screens 15, 16 may be used as a replacement screen for a screen of the fixed display system of the cockpit.

In this way, in case of failure of a screen 10a-10d, one or more screens 15, 16 may be used to display the information items necessary to the pilots in order to ensure proper piloting of the aircraft, and thus replace the faulty screen.

Storage of such a backup screen makes it possible to avoid the permanent presence of a useless screen and to allow its use only when the situation so requires.

FIGS. 4A, 5A, 6A, 7A illustrate different situations in which a screen 10a-10d (hatched on the Figures) of the fixed display system breaks down.

In this case, one of the screens, and for example here screen 15, is taken out from its storage position underneath the instrument panel, to be physically placed superposed on the faulty screen of the fixed display system.

In practice, screen 15 may be separated from the retractable shelf in order to be positioned manually in superposition on the faulty screen. An ancillary connector located near the faulty screen makes it possible to connect screen 15.

Alternatively, screen 15 may remain in the shelf, the latter being driven by appropriate kinematics in order to be moved from the storage position underneath the instrument panel to a more or less vertical position, in front of the faulty screen.

Once this screen 15 is configured for displaying the information items initially displayed on the faulty screen, screen 15 enables the pilots to display the information items necessary to the control operations of the aircraft while more or less retaining the initial visual path, screen 15 being disposed at the same place in the cockpit as the faulty screen to be replaced.

By way of example, on FIG. 4A, screen 10a is faulty.

One solution available to the pilot P is to replace this screen 10a with first screen 15, second screen 16 being able to be maintained in a first use position as a means for interaction (keyboard, pointer) with the display devices as illustrated on FIG. 4B, or also as a display means.

Likewise, on FIGS. 5A and 5B, central screen 10d is faulty and may be replaced in the same manner with first screen 15.

On FIG. 6A, when faulty screen 10a is identified, the pilot pulls out first screen 15 to superpose it on faulty screen 10a.

In this embodiment, second screen 16 is not used and remains stored underneath the instrument panel as illustrated on FIG. 6B.

FIGS. 7A and 7B similarly illustrate this type of use when central screen 10d is faulty.

An extreme situation in which all fixed screens 10a-10d break down also has been illustrated on FIGS. 8A to 8D.

On a standard aircraft, when such a situation is encountered, pilots P must use a backup means in order to complete their mission.

These backup means generally make it possible to bring the aircraft back to the ground but offer very limited functionalities.

Figure 8A:
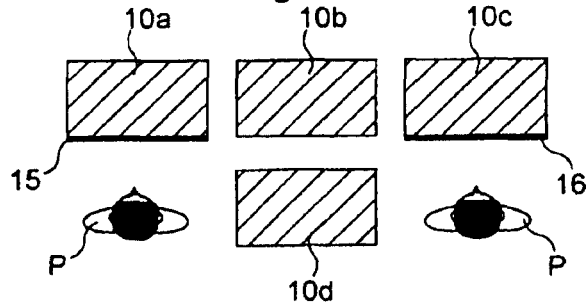
FIGS. 8A, 8B, 8C, 8D illustrate a method of use of the display screens when all the screens of a fixed display system are out of order.
Figure 8B:
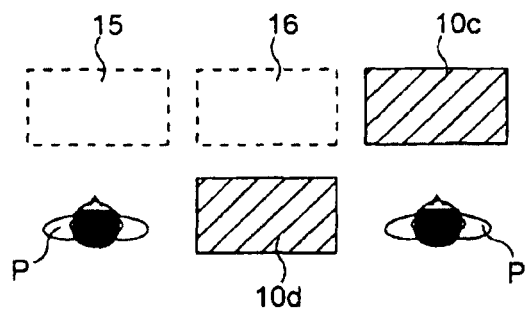
Figure 8C:
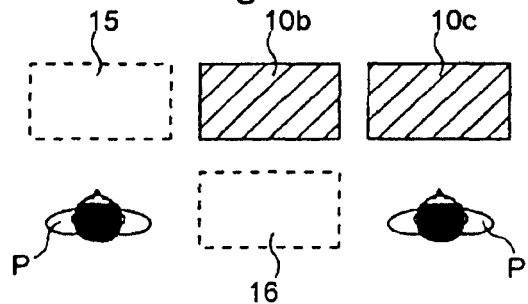
Figure 8D:
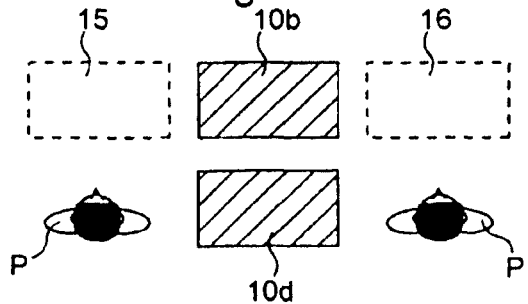

Here, as illustrated on FIGS. 8B to 8D, screens 15, 16 replace the faulty screens extremely well.

As regards touch screens, they make it possible not only to display all the necessary information items, but also to provide virtual means of interaction with the rest of the cockpit, in particular by virtue of the presence of a virtual keyboard or a virtual pointing component.

In this way, in case of failure of one or more screens, management of this failure may be accomplished in the following manner.

As soon as a display fault is detected (unexpected performance or incoherent display), the broken-down screen is taken out of service.

The pilots then decide whether the remaining display surface of the fixed display system of the cockpit is sufficient to carry the mission through to a successful conclusion or whether an additional screen is useful.

If the option of having a larger display surface available is useful, or if the flight requires the physical replacement of the faulty screen, at least one of the two screens 15, 16 accommodated in the shelves underneath the instrument panel is, for example, pulled out from its support.

This screen 15, 16 then is connected to one of the auxiliary connectors available in the cockpit, near fixed screens 10a-10d of the display system of the cockpit.

It then is fixed securely to the instrument panel.

Once the physical installation of the screen is accomplished, the pilot may configure this screen so as to have available the information items that he needs.

Of course, as indicated above, replacement screen 15, 16 may remain fixed in the shelf, the latter being movable in the cockpit by means of appropriate kinematics.

In this way, when the failure of a screen has been handled by the crew, screen 15, 16 makes it possible to restore the system for display of the information items available for the pilot.

Of course, many modifications may be made to the exemplary implementations described above without departing from the context of the invention.

The number of fixed and repositionable screens in the cockpit described above is in no way limitative.

The invention claimed is:

1. An aircraft cockpit comprising:
an avionic display device with several fixed screens; and
at least one screen as an ancillary, adapted to constitute a replacement or complementary screen for said avionic display device,
wherein said at least one screen is a touch screen accommodated in a retractable shelf installed sliding underneath an instrument panel of said aircraft cockpit, said touch screen being adapted to occupy a storage position underneath said instrument panel, a first use position in said retractable shelf in which said touch screen constitutes an interactive control unit to control different components of said aircraft cockpit, and a second use position in which said touch screen is disposed in a position of replacement or complement for a screen of the avionic display device.

2. The aircraft cockpit according to claim 1,
wherein in said second use position, said touch screen is pulled out from the retractable shelf.

3. The aircraft cockpit according to claim 1, wherein said touch screen is adapted to be positioned in said aircraft cockpit superposed on at least one fixed screen in said second use position.

4. The aircraft cockpit according to claim 1,
wherein said touch screen is adapted to be positioned in said aircraft cockpit in a position adjacent to at least one fixed screen, said touch screen being configured to display specific functions complementary to functions displayed on said fixed screen.

5. The aircraft cockpit according to claim 1,
wherein said touch screen constitutes, in said first use position, an interactive navigation unit in said fixed screens by control by a cursor.

6. The aircraft cockpit according to claim 1,
wherein in said first use position, said touch screen is adapted to provide a virtual keyboard and a virtual keypad.

7. An aircraft comprising the aircraft cockpit according to any of claims 1 to 6.

* * * * *